(12) United States Patent
Luu et al.

(10) Patent No.: US 9,542,089 B2
(45) Date of Patent: Jan. 10, 2017

(54) INTERACTIVE ELEMENTS IN A USER INTERFACE

(71) Applicant: Facebook, Inc., Menlo Park, CA (US)

(72) Inventors: Francis Luu, San Francisco, CA (US); Christopher Tice, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 91 days.

(21) Appl. No.: 13/959,673

(22) Filed: Aug. 5, 2013

(65) Prior Publication Data

US 2014/0298220 A1    Oct. 2, 2014

Related U.S. Application Data

(60) Provisional application No. 61/807,432, filed on Apr. 2, 2013.

(51) Int. Cl.
G06F 3/048 (2013.01)
G06F 3/0488 (2013.01)
G06F 3/0482 (2013.01)

(52) U.S. Cl.
CPC ........... *G06F 3/0488* (2013.01); *G06F 3/0482* (2013.01); *G06F 3/04883* (2013.01)

(58) Field of Classification Search
CPC combination set(s) only.
See application file for complete search history.

(56) References Cited

U.S. PATENT DOCUMENTS

| | | | |
|---|---|---|---|
| 6,243,724 B1* | 6/2001 | Mander et al. | 715/273 |
| 7,650,569 B1* | 1/2010 | Allen et al. | 715/720 |
| 8,296,684 B2* | 10/2012 | Duarte et al. | 715/863 |
| 8,627,195 B1* | 1/2014 | Hayden | 715/229 |
| 8,723,823 B2* | 5/2014 | Shia | G06Q 10/10 345/173 |
| 2005/0268237 A1* | 12/2005 | Crane et al. | 715/732 |
| 2007/0177803 A1* | 8/2007 | Elias et al. | 382/188 |
| 2007/0220441 A1* | 9/2007 | Melton et al. | 715/781 |
| 2008/0307330 A1* | 12/2008 | Louch et al. | 715/763 |
| 2008/0307334 A1* | 12/2008 | Chaudhri et al. | 715/764 |
| 2008/0307335 A1* | 12/2008 | Chaudhri et al. | 715/764 |
| 2008/0307360 A1* | 12/2008 | Chaudhri et al. | 715/835 |
| 2008/0307364 A1* | 12/2008 | Chaudhri et al. | 715/836 |
| 2010/0095240 A1* | 4/2010 | Shiplacoff et al. | 715/784 |
| 2010/0153844 A1* | 6/2010 | Hwang et al. | 715/702 |

(Continued)

OTHER PUBLICATIONS

International Search Report and Written Opinion for International Application PCT/US2014/032516, Aug. 27, 2014.

(Continued)

*Primary Examiner* — Hien Duong
(74) *Attorney, Agent, or Firm* — Baker Bott L.L.P.

(57) ABSTRACT

In particular embodiments, a computing device provides for presentation to a user a user interface, the user interface including a plurality of related interactive elements. The computing device may receive touch gesture input from the user selecting one of the plurality of related interactive elements. The touch gesture input may have a duration of at least a pre-determined amount of time. The computing device, in response to the touch gesture input, may rearrange the plurality of related interactive elements, rearranging including stacking the plurality of related interactive elements for presentation to the user.

20 Claims, 23 Drawing Sheets

(56) References Cited

U.S. PATENT DOCUMENTS

| | | | |
|---|---|---|---|
| 2010/0211872 A1* | 8/2010 | Rolston et al. | 715/702 |
| 2010/0251170 A1* | 9/2010 | Louch et al. | 715/810 |
| 2011/0078109 A1* | 3/2011 | Griggs et al. | 707/609 |
| 2011/0093890 A1* | 4/2011 | Araki et al. | 725/37 |
| 2011/0126156 A1* | 5/2011 | Krishnaraj et al. | 715/828 |
| 2011/0163970 A1* | 7/2011 | Lemay | 345/173 |
| 2011/0163971 A1* | 7/2011 | Wagner et al. | 345/173 |
| 2011/0208732 A1* | 8/2011 | Melton et al. | 707/728 |
| 2011/0291945 A1 | 12/2011 | Ewing, Jr. | |
| 2011/0298701 A1 | 12/2011 | Holzer | |
| 2012/0110064 A1 | 5/2012 | Chen | |
| 2012/0159381 A1 | 6/2012 | Tseng | |
| 2012/0210253 A1 | 8/2012 | Luna | |
| 2012/0226979 A1* | 9/2012 | Harberts et al. | 715/702 |
| 2012/0254903 A1 | 10/2012 | Brown | |
| 2012/0331548 A1 | 12/2012 | Tseng | |
| 2013/0080968 A1 | 3/2013 | Hanson | |
| 2013/0174179 A1* | 7/2013 | Park et al. | 718/107 |
| 2013/0227490 A1* | 8/2013 | Thorsander et al. | 715/841 |
| 2013/0346408 A1* | 12/2013 | Duarte | G06F 17/30598 707/737 |
| 2014/0059496 A1* | 2/2014 | White et al. | 715/841 |

OTHER PUBLICATIONS

International Search Report and Written Opinion for International Application PCT/US2014/032522, Aug. 13, 2014.

* cited by examiner

INTERACTIVE ELEMENTS IN A USER INTERFACE

PRIORITY

This application claims the benefit, under 35 U.S.C. §119(e), of U.S. Provisional Patent Application No. 61/807,432, filed 2 Apr. 2013, which is incorporated herein by reference.

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, one or more interactive elements may be displayed on a screen of a computing device (e.g., a mobile computing device) as part of a user interface. The interactive elements may, for example, represent communications from or activities of users of a social-networking system. In particular embodiments, when multiple interactive elements are displayed on a screen of the computing device, a user may perform a gesture to "stack" the interactive elements for display on the screen. As an example, the user may press and hold a particular interactive element on the screen, prompting the other interactive elements on the screen to stack behind the selected interactive element. In particular embodiments, individual interactive elements or a stack of interactive elements may be removed from display on the screen by a user gesture. As an example, the user may swipe to the right (or left) on an interactive element or stack of interactive elements, causing the interactive element or stack of interactive elements to be dismissed from the screen. Similarly, the user may reposition an interactive element or stack of interactive elements on the screen using a gesture.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multimedia objects, including, for example, icons, buttons, menus, images, video, or audios.

Figure 1:
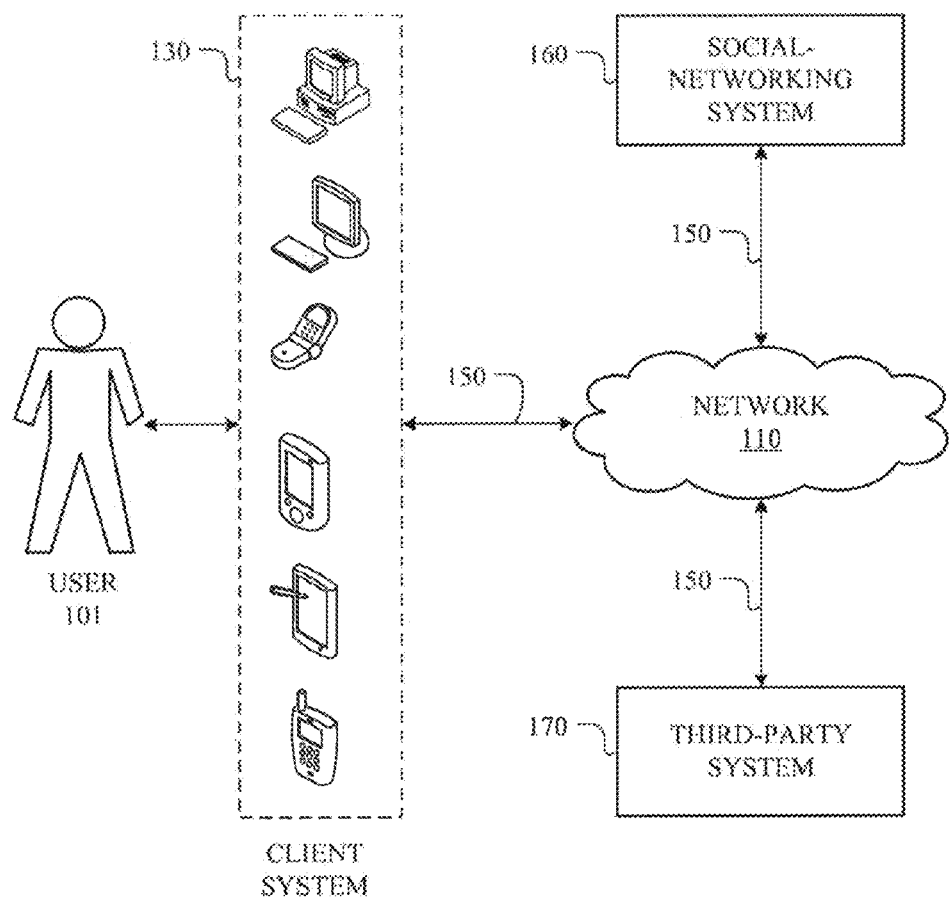
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
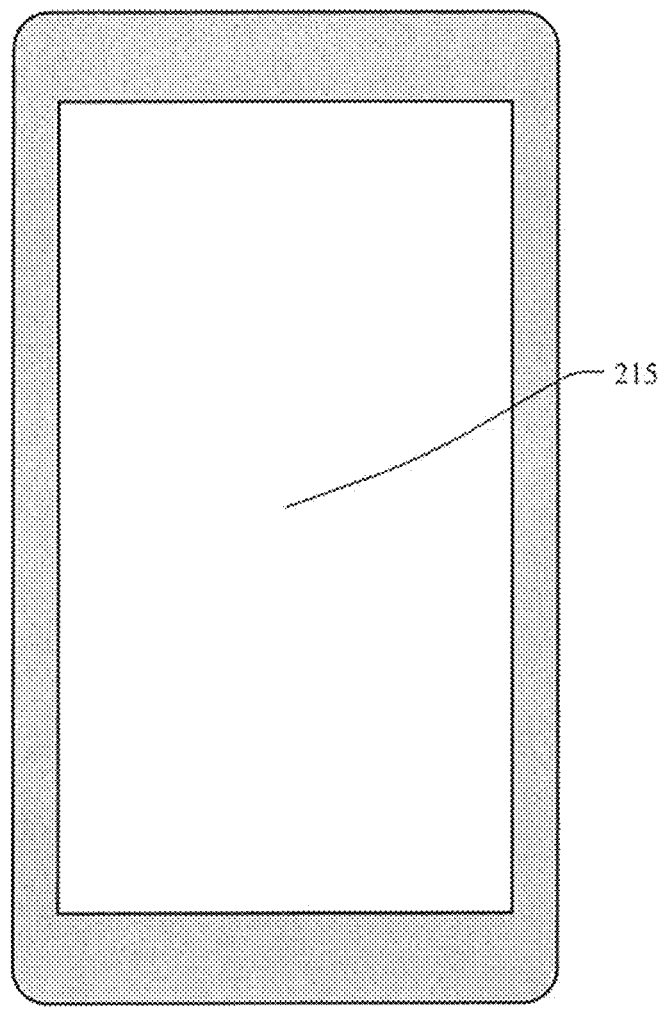
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
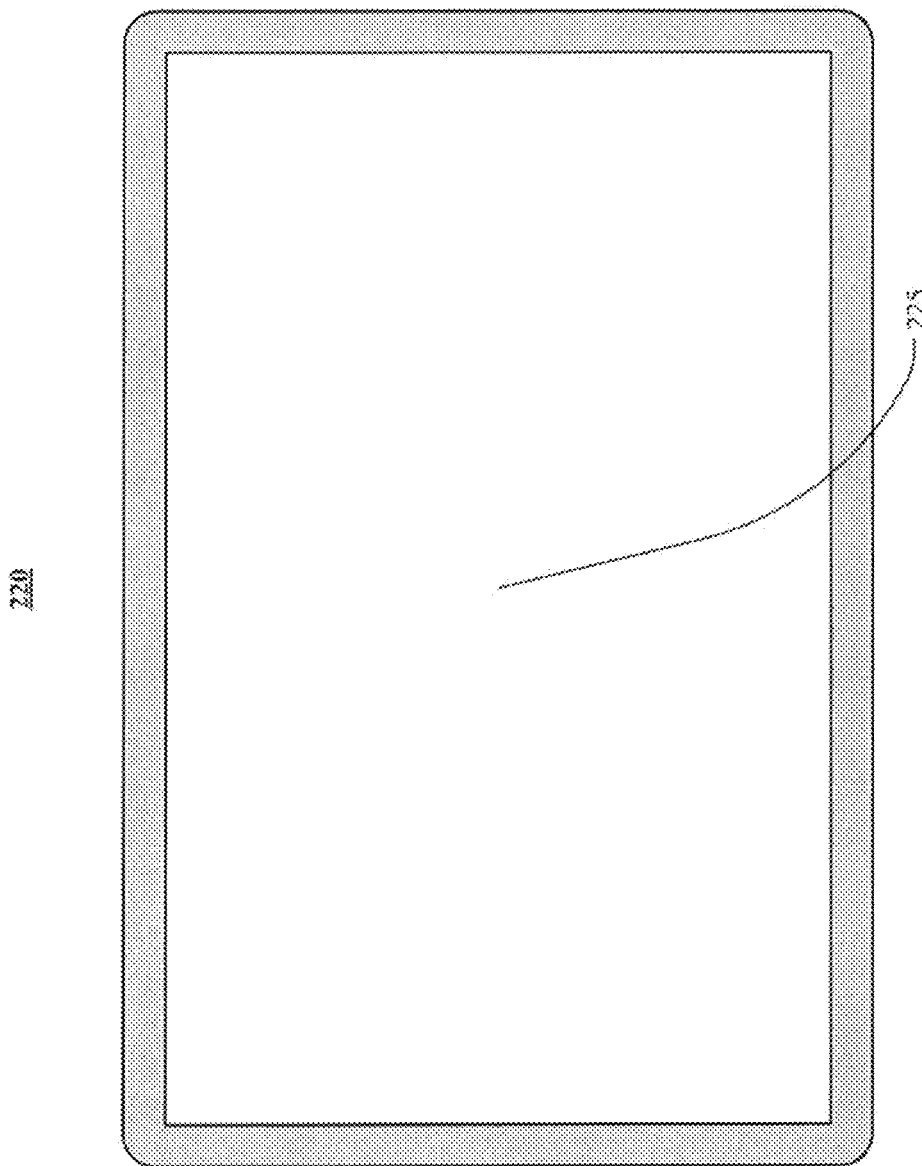

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, pinch close, pan, or drag, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
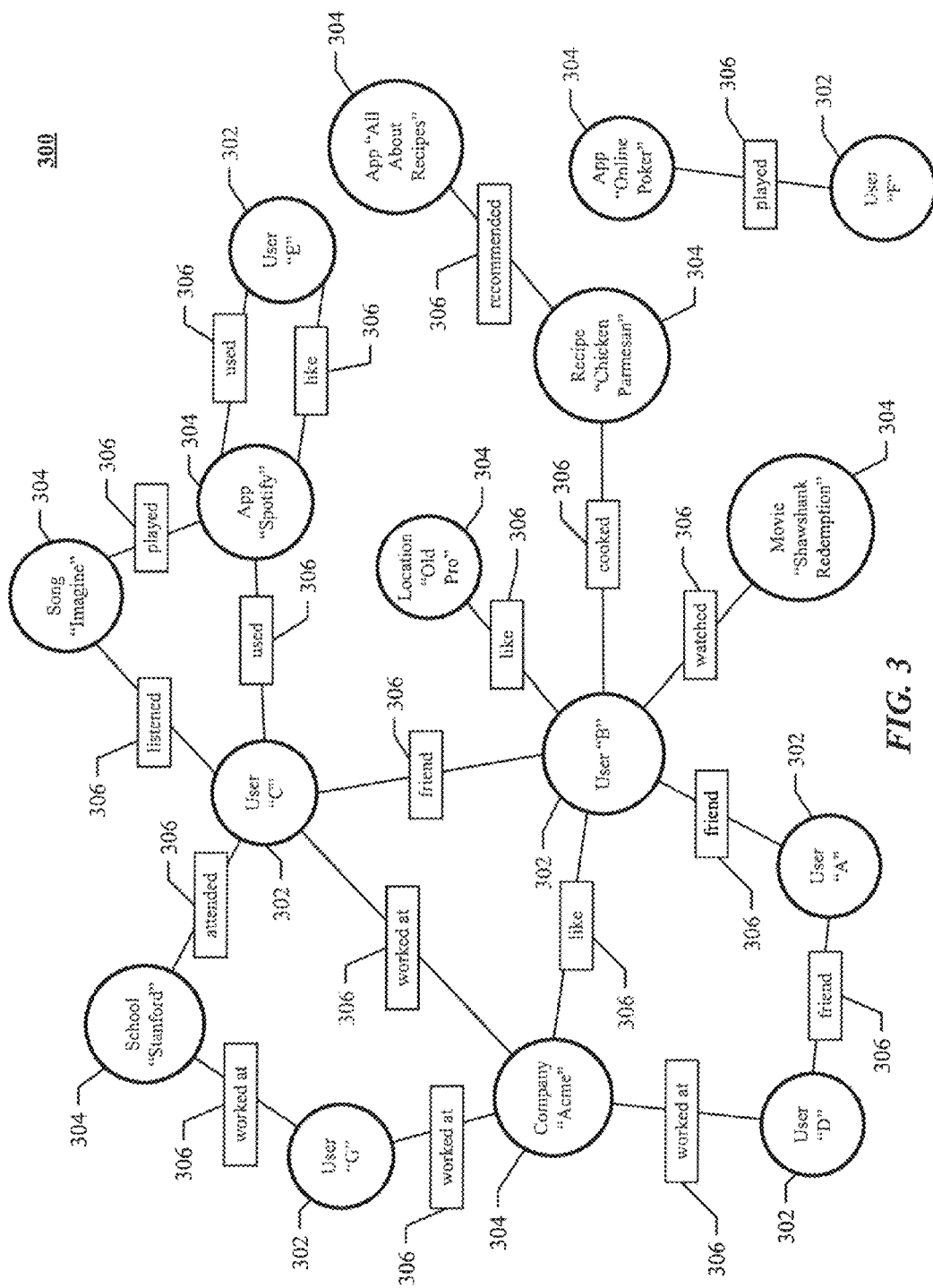
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
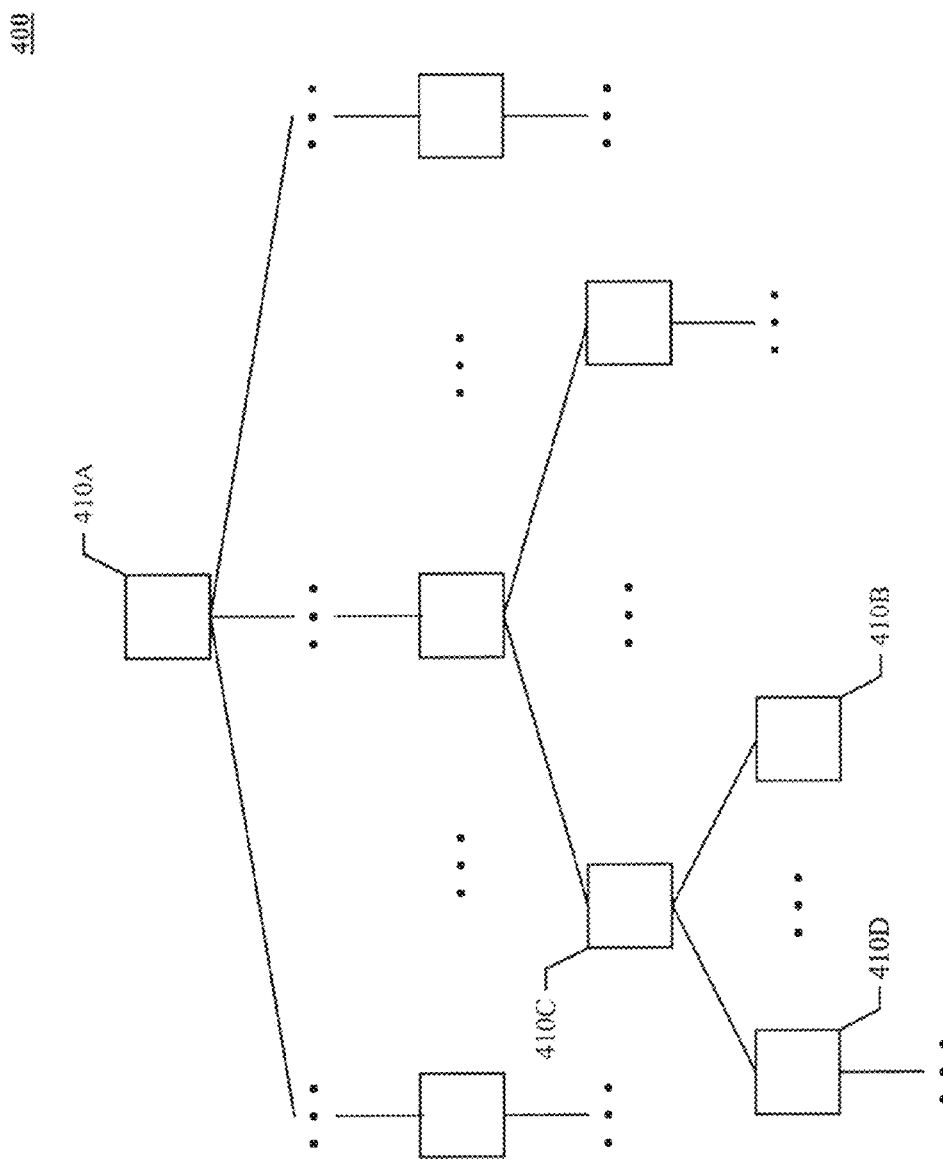
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, news feed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user may consume or interact with a content item when the user scrolls, opens up, views, listens to, selects, reviews, comments on, clicks on, or taps the content item This disclosure contemplates any applicable means for a user to consume or interact with a content item.

A user may interact with a computing device such as a mobile device (e.g., smartphone, tablet computer, etc.) through a user interface associated with an operating system or application running on the computing device (including, e.g., any third-party or factory-default applications). The application may be, for example, a news feed application associated with a social-networking website, a camera application, a photo-viewing application, a message or status composer, an email or chat application, a game, a web browser, a telephony or text-messaging application, or any other suitable type of application. The operating system running on the computing device may provide one or more screens for the computing device and its applications including, for example, a home screen, a lock screen, or a launch screen.

Figure 5A:
FIGS. 5A-5O illustrate example user interfaces with interactive elements.

In particular embodiments, while the user interacts with a user interface associated with an application, home screen, lock screen, or launch screen on the computing device, the user may be presented with an interactive element. An interactive element may include, for example, an icon, an image, a text block, a menu or portion of a menu, a button, a checkbox, a frame, a clickable link, a section, an input field, or any other suitable type of user-interface element. An interactive element of a user interface may be associated with the same application or operating system screen associated with the user interface. An interactive element of a user interface may be associated with a different application or screen (e.g., having its own user interface). As an example, if a user is viewing a home screen of the computing device, an interactive element associated with a news feed application may be displayed to the user within the user interface of the home screen (e.g., the interactive element may "float" on top of the display of the home screen). An interactive element may indicate information to the user of the computing device. As an example, the interactive element may indicate that the user has received a message from a second user on a social-networking website in which both participate. The interactive element may, in particular embodiments, include some or all of the text of the message and may, in other embodiments, be displayed without text of the message. Any suitable type of information may be indicated by an interactive element including, for example, breaking news, trending topics, or actions associated with other users of the social-networking website. For example, an interactive element may include text indicating an action associated with a second user of the social-networking website, such as the second user tagging the device user in a post or the second user liking a post of the device user in the social-networking website. In particular embodiments, an interactive element may indicate more than one type of information. As an example, the interactive element may indicate that the device user has received a message from a second user of a social-networking website, and it may also indicate that the second user is performing one or more actions (e.g., associated with the social-networking website). An interactive element may, in particular embodiments, not be associated with a particular item of information or event—for example, an interactive element may correspond only to the opening of a user interface of an application on the computing device. FIG. 5A illustrates an example screen of a computing device with multiple interactive elements, including interactive elements indicating messages received by the user of the computing device as well as actions associated with users of a social-networking website.

Figure 5B:
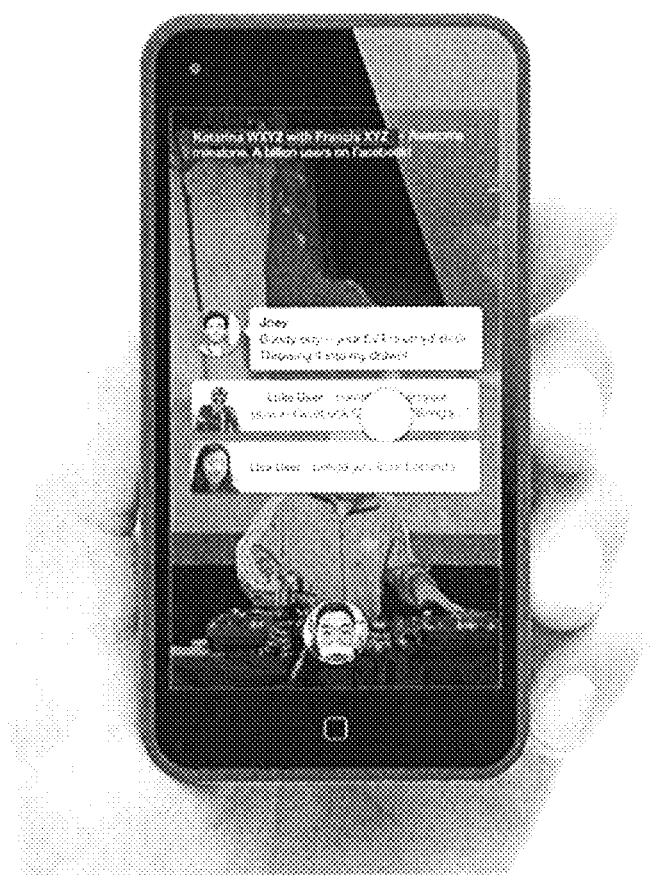
FIG. 5P illustrates an example method for selecting an interactive element on a computing device.
FIG. 5Q illustrates an example method for rearranging interactive elements.

An interactive element may be displayed in a persistent manner. In particular embodiments, an interactive element may be displayed until the computing device receives user input such as, for example, user input selecting the interactive element or user input dismissing the interactive element. By way of example, user input selecting an interactive element may include clicking on or near the interactive element (using, e.g., an input/output device such as a mouse or a track pad), tapping on or near the interactive element (using, e.g., a stylus or the user's finger), dragging the interactive element, or any other suitable touch or gesture (e.g. single tap, double tap, short press, long press, slide, swipe, flip, pinch open, or pinch close on or near the interactive element). Different user inputs may result in selection of the interactive element, and this disclosure contemplates any applicable user input for selection. Additionally, different types of user inputs may be mapped by the computing device to different types of behaviors within a user interface. For example, the user may select the interactive element by pressing on or near the element on a screen of the computing device. The user may reposition the interactive element for continued display on the screen by selecting the interactive element (e.g. by pressing it) and dragging it to a desired location on the screen. The user may also select the interactive element by tapping the interactive element, opening, for example, a user interface of an application. The user may also open a user interface associated with an interactive element by selecting and dragging the interactive element to a particular area of the screen (e.g., the rightmost edge). User input dismissing the interactive element may include any suitable touch or gesture, such as those described above. The user may, for example, provide input to dismiss the interactive element by pressing the interactive element and dragging it "off" (e.g. toward the edge of) the screen of the computing device. If the computing device receives user input to dismiss the interactive element, the interactive element may be removed from display to the user (e.g., removed from the screen display of the computing device). The interactive element, when dismissed, may gradually disappear (e.g., fade out) from the screen of the mobile device. In particular embodiments, when the computing device receives user input selecting an interactive element (e.g., by any of the gestures or actions described above), a user interface (e.g., of an application associated with the interactive element) is opened by the computing device. FIG. 5B illustrates an example of a user tapping on an interactive element to select the element on a screen of a computing device.

Figure 5C:
Figure 5D:
Figure 5E:
Figure 5F:
Figure 5G:
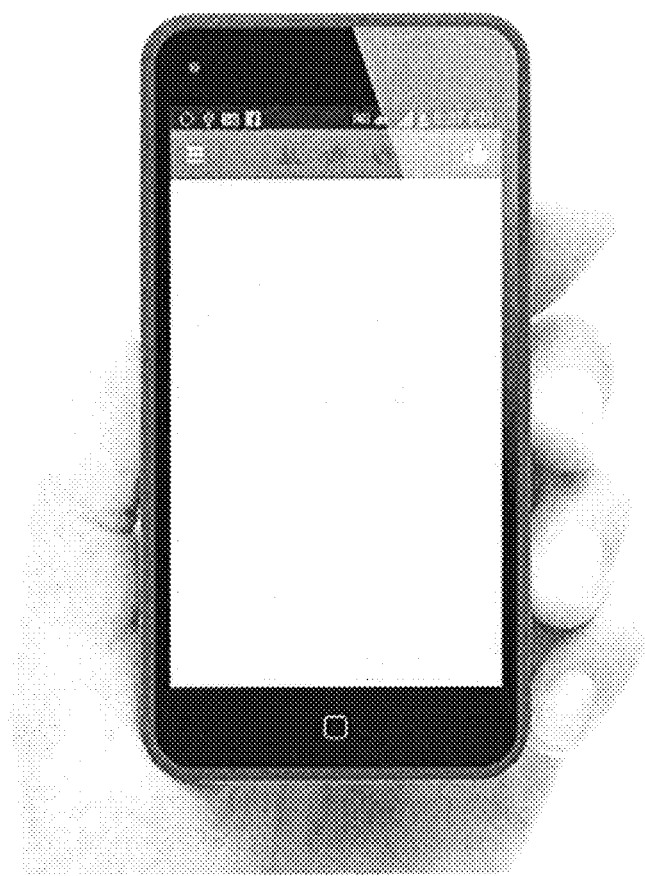
Figure 5H:
Figure 5I:

In particular embodiments, when the computing device receives user input selecting an interactive element (e.g., by a tap), an animation associated with the interactive element may occur. As an example, a user of the computing device may perform a first gesture to interact with an interactive element on a home or lock screen of the computing device. As an example, the device user may tap an interactive element (e.g., a notification of a second user's activity on a social-networking website) on a lock screen of the computing device. The device user's first gesture (e.g., tap) may cause an animation in the user interface to occur. For example, the interactive element tapped by the device user on the lock screen may "flip" to reveal text instructing the device user to perform a second gesture (e.g., another tap, a slide, a swipe, etc.) to unlock the screen or enter an application corresponding to the interactive element. Any suitable animation or action is contemplated by this disclosure. FIGS. 5C-5E illustrate an example of an interactive element tapped by a device user flipping to reveal text instructing the device user to "Tap again to view" the selected interactive element (e.g., in a user interface of the application associated with the interactive element). FIG. 5H illustrates an example of an interactive element tapped by a device user flipping to reveal text instructing the device user to "Slide to unlock" the device (and, e.g., view the selected interactive element in a user interface of the application associated with the interactive element). If, for example, the interactive element represents a message received from a second user of a social-networking system, the second gesture (e.g., a second tap or a slide after a first tap) may cause the corresponding messaging application to be opened on the computing device and presented to the device user. FIG. 5F illustrates an example of a device user performing a second tap gesture (e.g., after a first tap gesture), and FIG. 5I illustrates an example of a device user performing a slide gesture (e.g., after a tap gesture). FIG. 5G illustrates an example of an application corresponding to the interactive element being opened on the computing device after the first and second gestures have been completed. In particular embodiments, if the computing device is locked with a pin- or password-entry requirement, the second gesture performed by the device user (corresponding, e.g., to gesture instructions presented to the device user) may cause a pin- or password-entry screen to be opened on the computing device. If the device user correctly enters the pin or password, the application corresponding to the selected interactive element may then be opened. In particular embodiments, the recency or level of the device user's interaction with the computing device may determine whether a user's interaction with an interactive element (e.g., using a gesture) directly opens an application associated with the interactive element or requires a second gesture before opening the application. As an example, the device user may, after recent (e.g., within the last 2 minutes) or intensive (e.g., meeting a threshold of gestures per time interval) interaction with the computing device, tap an interactive element on a home screen of the computing device. The device user's gesture (e.g., tap) may cause the application associated with the interactive element to open directly, without need for a second gesture to be performed by the device user, based on the recency or level of the device user's interaction with the computing device.

Figure 5J:
Figure 5K:
Figure 5L:
Figure 5M:
Figure 5N:
Figure 50:

In particular embodiments, a user may be presented with multiple interactive elements that may indicate information to the user. As an example, two different interactive elements may indicate that the user has received two different messages, one from a first user and one from a second user on a social-networking website. Any suitable type of information may be indicated by one or more interactive elements displayed to the user. In particular embodiments, the display and function of each of multiple interactive elements are independent. For example, a first interactive element may be selected, dismissed, or otherwise interacted with independent of a second interactive element. In yet other embodiments, the movement or dismissal of one or more interactive elements causes the automatic repositioning of the remaining interactive elements. In particular embodiments, multiple interactive elements may be configured to be displayed to the user in a stack or a pile on a screen of the computing device, either automatically or in response to a user gesture. In particular embodiments, when multiple interactive elements are displayed on a screen of the computing device, the user may perform a gesture to "stack" the interactive elements for display on the screen. As an example, the user may press and hold a particular interactive element on the screen, prompting the other interactive elements on the screen to stack behind the selected interactive element. In particular embodiments, if the interactive elements are displayed in a stack or a pile, and if the user selects the stack (e.g., by tapping the topmost element of the stack), a user interface may be opened. As another example, if the interactive elements are displayed in a stack or a pile, the user may dismiss the stack or pile of interactive elements by pressing and holding the stack or pile and dragging it "off" (e.g. toward the edge of) the screen of the computing device. This disclosure contemplates any suitable arrangement of interactive elements in a display to a user of a computing device including, for example, a stack or pile, a vertical series, a horizontal series, or a fan-out display. As an example, the interactive elements may be displayed in a digest form (e.g., including recent messages or notifications of actions of other users) on a home screen of a computing device. In the example of a stack or pile display, the display may include a visual indicator that the stack contains more than one interactive element. Additionally, the choice of interactive element for the "top" of the stack may depend on other information—for example, the top element may correspond to the most recent message sent to the user or a message that has not yet been read by the user, or the top element may correspond to the element selected by the user to be the top element. The user may be able to select, drag, and drop interactive elements from a pile or series (or any other arrangement) to desired locations on the screen of the computing device. In particular embodiments, the user may specify where interactive elements appear on a screen of the computing device. FIG. 5J illustrates an example screen of a computing device with multiple interactive elements displayed in a series. FIG. 5K illustrates a user gesture to select one of the interactive elements (e.g., pressing and holding of the element) to be the top of a yet-to-be constructed stack of the interactive elements. FIGS. 5L and 5M illustrate the animation and result of the user's gesture (e.g., press and hold) to cause the stacking of the interactive elements displayed on the screen behind the selected interactive element. FIG. 5N illustrates a user gesture to dismiss the stack of interactive elements via a swipe to the left of the screen, and FIG. 5O illustrates the result of the user's dismissal of the stack of interactive elements. In the example of FIG. 5O, the text in the user interface is altered once the interactive elements are dismissed.

Figure 5P:
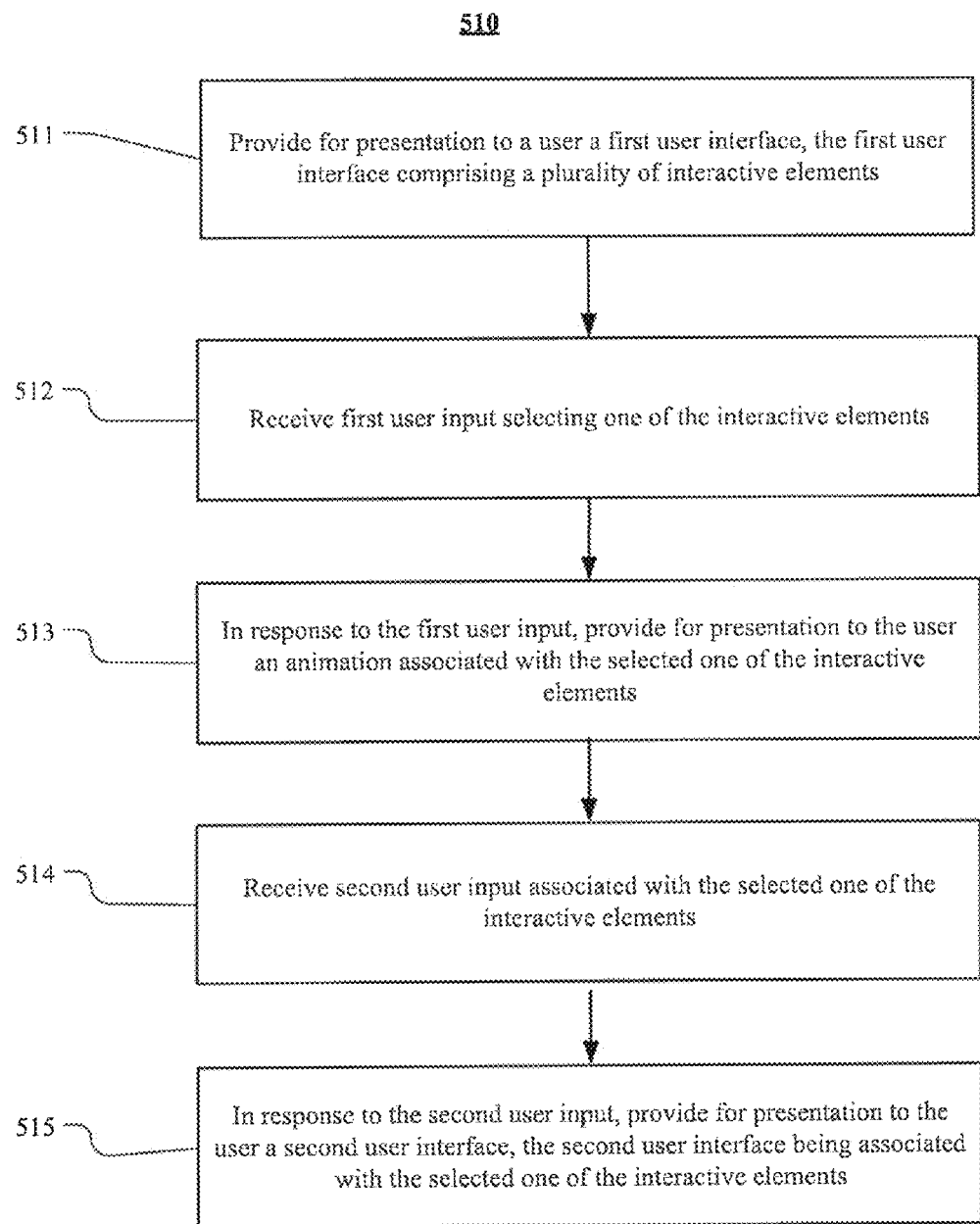

FIG. 5P illustrates an example method 510 for selecting an interactive element on a computing device. The method may begin at step 511, where a computing device provides for presentation to a user a first user interface, the first user interface comprising a plurality of interactive elements. At step 512, the computing device receives first user input selecting one of the interactive elements. At step 513, the computing device, in response to the first user input, provides for presentation to the user an animation associated with the selected one of the interactive elements. At step 514, the computing device receives second user input associated with the selected one of the interactive elements. At step 515, the computing device, in response to the second user input, provides for presentation to the user a second user interface, the second user interface being associated with the selected one of the interactive elements. Particular embodiments may repeat one or more steps of the method of FIG. 5P, where appropriate. Although this disclosure describes and illustrates particular steps of the method of FIG. 5P as occurring in a particular order, this disclosure contemplates any suitable steps of the method of FIG. 5P occurring in any suitable order. Moreover, although this disclosure describes and illustrates an example method for selecting an interactive element on a computing device including the particular steps of the method of FIG. 5P, this disclosure contemplates any suitable method for selecting an interactive element on a computing device including any suitable steps, which may include all, some, or none of the steps of the method of FIG. 5P, where appropriate. Furthermore, although this disclosure describes and illustrates particular components, devices, or systems carrying out particular steps of the method of FIG. 5P, this disclosure contemplates any suitable combination of any suitable components, devices, or systems carrying out any suitable steps of the method of FIG. 5P.

Figure 5Q:
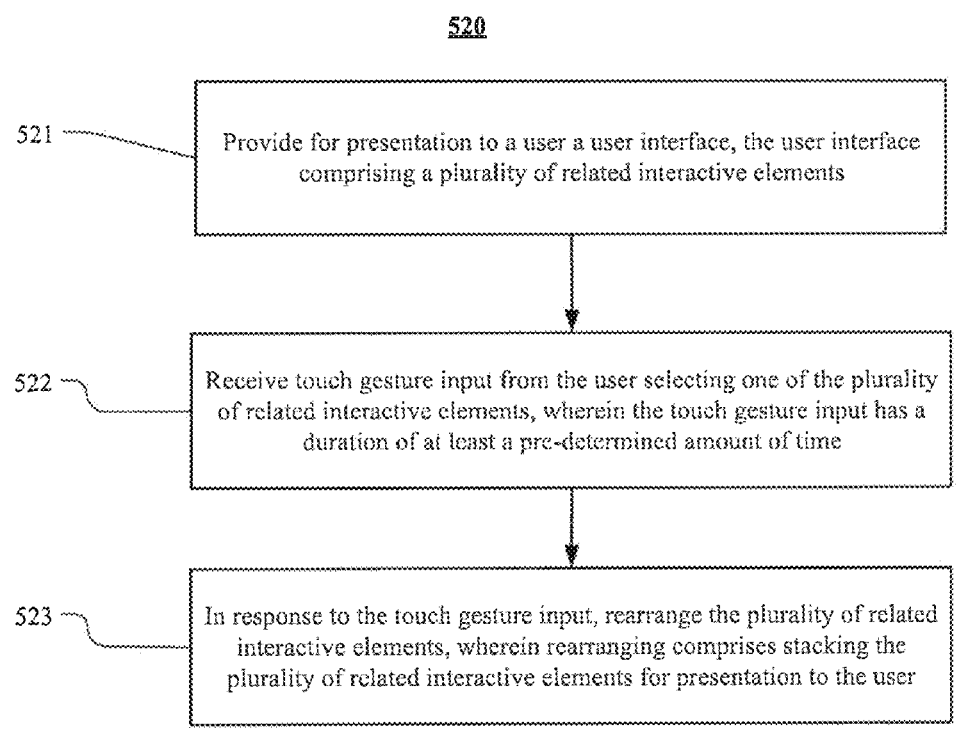

FIG. 5Q illustrates an example method 520 for rearranging interactive elements. The method may begin at step 521, where a computing device provides for presentation to a user a user interface, the user interface comprising a plurality of related interactive elements. At step 522, the computing device receives touch gesture input from the user selecting one of the plurality of related interactive elements, wherein the touch gesture input has a duration of at least a predetermined amount of time. At step 523, the computing device, in response to the touch gesture input, rearranges the plurality of related interactive elements, wherein rearranging comprises stacking the plurality of related interactive elements for presentation to the user. Particular embodiments may repeat one or more steps of the method of FIG. 5Q, where appropriate. Although this disclosure describes and illustrates particular steps of the method of FIG. 5Q as occurring in a particular order, this disclosure contemplates any suitable steps of the method of FIG. 5Q occurring in any suitable order. Moreover, although this disclosure describes and illustrates an example method for rearranging interactive elements including the particular steps of the method of FIG. 5Q, this disclosure contemplates any suitable method for rearranging interactive elements including any suitable steps, which may include all, some, or none of the steps of the method of FIG. 5Q, where appropriate. Furthermore, although this disclosure describes and illustrates particular components, devices, or systems carrying out particular steps of the method of FIG. 5Q, this disclosure contemplates any suitable combination of any suitable components, devices, or systems carrying out any suitable steps of the method of FIG. 5Q.

Figure 6:
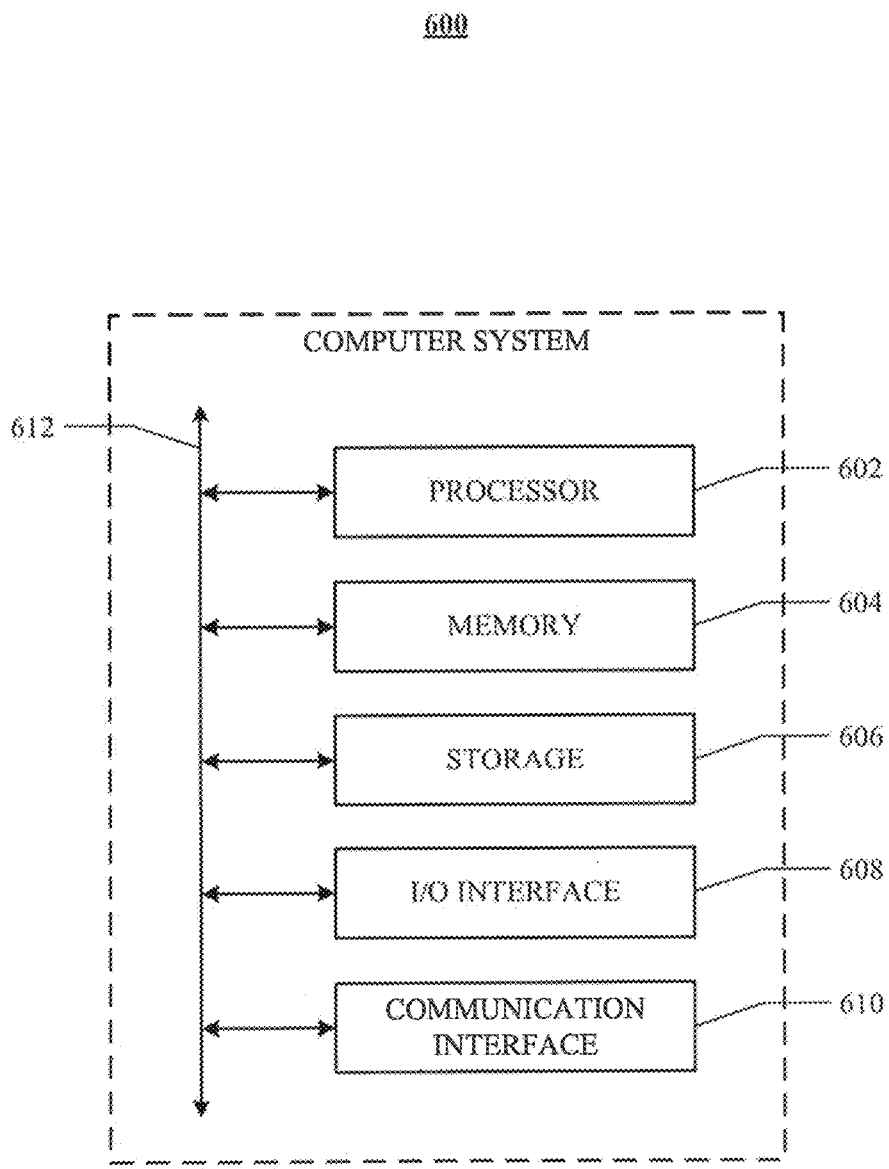
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, providing for presentation to a user a user interface, the user interface comprising a plurality of content items arranged in a hierarchy, the hierarchy having one or more layers and each layer comprising at least one of the content items of the user interface;
   by the computing device, providing for presentation to the user the user interface according to a structure of the hierarchy, comprising:
      presenting a background layer of the user interface at a first layer, and
      presenting a plurality of related interactive elements of the user interface at a second layer concurrently with the first layer, the plurality of related interactive elements overlaying the background layer, wherein each interactive element comprises a notification sent by an online social-networking system;
   by the computing device, receiving a first touch gesture input from the user selecting one of the plurality of related interactive elements, wherein the first touch gesture input has a duration of at least a pre-determined amount of time; and
   by the computing device, in response to the first touch gesture input, rearranging the plurality of related interactive elements, wherein rearranging comprises stacking the plurality of related interactive elements at the second layer overlaying the background layer for presentation to the user; and
   by the computing device, receiving a second touch gesture input from the user, the second touch gesture input comprising selecting the stack of related interactive elements and swiping the stack of related interactive elements in a direction on the user interface, wherein swiping the stack of related interactive elements results in a dismissal of the stack.

2. The method of claim 1, wherein a first element of the stack of related interactive elements presented to the user comprises the selected one of the related interactive elements.

3. The method of claim 2, wherein the first element of the stack is fully visually presented to the user, and wherein the stack comprises one or more visual indicators that the stack includes additional elements.

4. The method of claim 1, wherein the first touch gesture input comprises pressing and holding.

5. The method of claim 1, wherein the second touch gesture input comprises swiping the stack of related interactive elements to the left or right.

6. The method of claim 1, wherein the dismissal of the stack causes the related interactive elements to gradually disappear from the user interface.

7. The method of claim 1, wherein the notification sent by the online social-networking system comprises a message, a like, a friend request, a post, a news item, or an action by a user of an online social network hosted by the online social-networking system.

8. A system comprising:
   a computing device, the computing device comprising one or more processors; and a memory coupled to the processors comprising instructions executable by the processors, the processors operable when executing the instructions to:

provide for presentation to a user a user interface, the user interface comprising a plurality of content items arranged in a hierarchy, the hierarchy having one or more layers and each layer comprising at least one of the content items of the user interface;

provide for presentation to the user the user interface according to a structure of the hierarchy, comprising:
presenting a background layer of the user interface at a first layer, and
presenting a plurality of related interactive elements of the user interface at a second layer concurrently with the first layer, the plurality of related interactive elements overlaying the background layer, wherein each interactive element comprises a notification sent by an online social-networking system;

receive a first touch gesture input from the user selecting one of the plurality of related interactive elements, wherein the first touch gesture input has a duration of at least a pre-determined amount of time; and in response to the first touch gesture input, rearrange the plurality of related interactive elements, wherein rearranging comprises stacking the plurality of related interactive elements at the second layer overlaying the background layer for presentation to the user; and receive a second touch gesture input from the user, the second touch gesture input comprising selecting the stack of related interactive elements and swiping the stack of related interactive elements in a direction on the user interface, wherein swiping the stack of related interactive elements results in a dismissal of the stack.

9. The system of claim 8, wherein a first element of the stack of related interactive elements presented to the user comprises the selected one of the related interactive elements.

10. The system of claim 9, wherein the first element of the stack is fully visually presented to the user, and wherein the stack comprises one or more visual indicators that the stack includes additional elements.

11. The system of claim 8, wherein the first touch gesture input comprises pressing and holding.

12. The system of claim 8, wherein the second touch gesture input comprises swiping the stack of related interactive elements to the left or right.

13. The system of claim 8, wherein the dismissal of the stack causes the related interactive elements to gradually disappear from the user interface.

14. The system of claim 8, wherein the notification sent by the online social-networking system comprises a message, a like, a friend request, a post, a news item, or an action by a user of an online social network hosted by the online social-networking system.

15. One or more computer-readable non-transitory storage media embodying software that is operable when executed to:

provide for presentation to a user a user interface, the user interface comprising a plurality of content items arranged in a hierarchy, the hierarchy having one or more layers and each layer comprising at least one of the content items of the user interface;

provide for presentation to the user the user interface according to a structure of the hierarchy, comprising:
presenting a background layer of the user interface at a first layer, and
presenting a plurality of related interactive elements of the user interface at a second layer concurrently with the first layer, the plurality of related interactive elements overlaying the background layer, wherein each interactive element comprises a notification sent by an online social-networking system;

receive a first touch gesture input from the user selecting one of the plurality of related interactive elements, wherein the first touch gesture input has a duration of at least a pre-determined amount of time; and in response to the first touch gesture input, rearrange the plurality of related interactive elements, wherein rearranging comprises stacking the plurality of related interactive elements at the second layer overlaying the background layer for presentation to the user; and receive a second touch gesture input from the user, the second touch gesture input comprising selecting the stack of related interactive elements and swiping the stack of related interactive elements in a direction on the user interface, wherein swiping the stack of related interactive elements results in a dismissal of the stack.

16. The media of claim 15, wherein a first element of the stack of related interactive elements presented to the user comprises the selected one of the related interactive elements.

17. The media of claim 16, wherein the first element of the stack is fully visually presented to the user, and wherein the stack comprises one or more visual indicators that the stack includes additional elements.

18. The media of claim 15, wherein the first touch gesture input comprises pressing and holding.

19. The media of claim 15, wherein the second touch gesture input comprises swiping the stack of related interactive elements to the left or right.

20. The media of claim 15, wherein the notification sent by the online social-networking system comprises a message, a like, a friend request, a post, a news item, or an action by a user of an online social network hosted by the online social-networking system.

* * * * *